(12) United States Patent
Jaccoud et al.

(10) Patent No.: US 12,722,622 B2
(45) Date of Patent: Sep. 1, 2026

(54) HYBRID VEHICLE ENGINE IDLING CONTROL

(71) Applicant: JAGUAR LAND ROVER LIMITED, Whitley (GB)

(72) Inventors: Rodolfo Oliveira Jaccoud, Leamington Spa (GB); Matthew Hancock, Rugby (GB); Olivier Jean Brice Roques, Banbury (GB)

(73) Assignee: Jaguar Land Rover Limited, Whitley (GB)

( * ) Notice: Subject to any disclaimer, the term of this patent is extended or adjusted under 35 U.S.C. 154(b) by 91 days.

(21) Appl. No.: 17/791,729

(22) PCT Filed: Jan. 10, 2021

(86) PCT No.: PCT/EP2021/050323

§ 371 (c)(1),
(2) Date: Jul. 8, 2022

(87) PCT Pub. No.: WO2021/140237

PCT Pub. Date: Jul. 15, 2021

(65) Prior Publication Data

US 2023/0083854 A1 Mar. 16, 2023

(30) Foreign Application Priority Data

Jan. 9, 2020 (GB) ..................................... 2000307

(51) Int. Cl.
*B60W 10/06* (2006.01)
*B60W 10/30* (2006.01)
(Continued)

(52) U.S. Cl.
CPC ............ *B60W 20/15* (2016.01); *B60W 10/06* (2013.01); *B60W 10/30* (2013.01);
(Continued)

(58) Field of Classification Search
CPC ...... B60W 20/10; B60W 20/00; B60W 20/15; B60W 10/02; B60W 10/06; B60W 10/30; B60W 50/0205; F02N 11/0859
See application file for complete search history.

(56) References Cited

U.S. PATENT DOCUMENTS 6,335,573 B1 * 1/2002 Eguchi ............ B60W 30/18018 290/40 C
9,216,735 B2 * 12/2015 Watanabe ............. B60W 20/00
(Continued)

FOREIGN PATENT DOCUMENTS

CN 109017749 A1 12/2018
EP 2631466 A1 8/2013

OTHER PUBLICATIONS

Combined Search and Examination report corresponding to Great Britain Application No. GB2000307.5, Jul. 2, 2020, 5 pages.
(Continued)

*Primary Examiner* — Gonzalo Laguarda
(74) *Attorney, Agent, or Firm* — Troutman Pepper Locke LLP; Dustin B. Weeks; Nicholas H. Doss

(57) ABSTRACT

Aspects of the present invention relate to a method and to a control system for controlling an engine and an electric traction motor of a vehicle, the control system comprising one or more controllers, wherein the control system is configured to: receive an indication of engine speed during engine idling; and control the electric traction motor to reduce a difference between the engine speed and an engine idle speed target.

20 Claims, 5 Drawing Sheets

(51) Int. Cl.

| | |
|---|---|
| ***B60W 20/15*** | (2016.01) |
| ***B60W 50/02*** | (2012.01) |
| ***F02N 11/08*** | (2006.01) |

(52) U.S. Cl.

CPC ..... *B60W 50/0205* (2013.01); *F02N 11/0859* (2013.01); *B60W 2510/0638* (2013.01); *B60W 2510/101* (2013.01); *B60W 2510/244* (2013.01)

(56) References Cited

U.S. PATENT DOCUMENTS

| | | | | |
|---|---|---|---|---|
| 9,327,704 | B2 * | 5/2016 | Kim | B60W 20/17 |
| 9,628,011 | B2 * | 4/2017 | DeMarco | F02D 41/12 |
| 10,393,036 | B2 * | 8/2019 | Pursifull | B60W 10/06 |
| 10,780,772 | B2 * | 9/2020 | Deshpande | B60L 50/10 |
| 11,186,266 | B2 * | 11/2021 | Mizuguchi | B60K 6/48 |
| 2002/0163199 | A1 * | 11/2002 | Ramaswamy | B60K 6/445<br>290/40 C |
| 2009/0143188 | A1 * | 6/2009 | Soliman | B60W 20/10<br>903/946 |
| 2019/0257279 | A1 | 8/2019 | Tomiyoshi | |
| 2024/0174215 | A1 * | 5/2024 | Yamaguchi | B60W 20/00 |

OTHER PUBLICATIONS

International Search Report corresponding to International Application No. PCT/EP2021/050323, dated Dec. 2, 2021, 4 pages.

Written Opinion corresponding to International Application No. PCT/EP2021/050323, dated Dec. 2, 2021, 6 pages.

Wikipedia: "Maximum brake torque", Nov. 24, 2018 (Nov. 24, 2018), Retrieved from the Internet: URL:https://en.wikipedia.org/w/index.php?title=Maximum_brake_torque&oldid=870419198 [retrieved on Oct. 23, 2024].

European Office Action corresponding to application 21 700 400.1, dated Oct. 29, 2024, 6 pages.

Examination Report in related European Application No. EP21700400.1, mailed May 4, 2026 (10 pages).

* cited by examiner

Receive requirement for engine torque>idle

502

500

Control engine torque to charging target

504

Control electric motor torque to maintain idle speed

506

HYBRID VEHICLE ENGINE IDLING CONTROL

TECHNICAL FIELD

The present disclosure relates to a hybrid vehicle control system and method. In particular, but not exclusively it relates to a hybrid vehicle control system and method for controlling engine idling.

BACKGROUND

In a typical hybrid electric vehicle, one or more electric traction motors are used to contribute at least some tractive output torque ('torque' herein), to reduce or eliminate use of an internal combustion engine ('engine' herein) and therefore to reduce fuel consumption and emissions. If torque demand is high, or a traction battery state of charge is low, a contribution from the engine may be needed.

An engine is less responsive than an electric traction motor. Responsiveness is defined as a latency between a requested change in torque and a change in output torque. Electric traction motor responsiveness is greater for various reasons. For example, engines have greater inertia than electric traction motors. A modified air charge takes considerable time to be inducted into the engine. Engines can rarely be operated at their greatest achievable thermal efficiency.

The responsiveness of an engine can be controlled to some extent, by adjusting its rate of change of output torque within a controllable range. The rate can be adjusted by changing parameters such as engine torque reserve (spark retard), air-fuel ratio, valve timing, and/or valve lift, for example.

The above parameters can be controlled to maintain engine idling. For example, engine torque reserve may be implemented so that spark retard can be controlled to quickly reduce engine idle speed error.

SUMMARY OF THE INVENTION

It is an aim of the present invention to address one or more of the disadvantages associated with the prior art. Aspects and embodiments of the invention provide a control system, a vehicle, a method, and computer software, as claimed in the appended claims.

According to an aspect of the invention there is provided a control system for controlling an engine and an electric traction motor of a vehicle, the control system comprising one or more controllers, wherein the control system is configured to: receive an indication of engine speed during engine idling; and control the electric traction motor to reduce a difference between the engine speed and an engine idle speed target. An advantage is an engine idling function with lower emissions and fast responsiveness to idle speed errors.

The control system may be configured to control the engine based on a charging target for traction battery charging. An advantage is improved energy management because chemical energy can be converted to electrical energy during engine idling.

The charging target may be variable to enable a variable rate of charging, and the control system may be configured to vary torque of the engine based on variation of the charging target. An advantage is further improved energy management.

The control system may be configured to control the engine based on the charging target while maintaining an engine torque reserve of substantially zero. The control system may be configured to control the engine based on the charging target while maintaining an ignition timing retardation of zero or less than 5 degrees of retardation from a maximum brake torque ignition timing or from a most efficient ignition timing of a control map for the engine (if different). An advantage is improved efficiency.

The control system may be configured to: receive an indication of a requirement to increase engine torque above a torque required to maintain engine speed at the engine idle speed target, based on the charging target; wherein controlling the engine based on a charging target comprises controlling the engine to provide an increase in torque towards an engine torque target associated with the requirement; and wherein controlling the electric traction motor to reduce a difference between the engine speed and an engine idle speed target comprises controlling the electric traction motor to provide inhibiting torque to inhibit the increase in torque of the engine from causing a deviation of engine speed from the engine idle speed target. An advantage is improved control of charging during engine idling.

The control system may be configured to: receive an indication of a requirement to increase engine speed above the engine idle speed target; and control at least the electric traction motor to reduce a difference between the engine speed and an engine speed target associated with the requirement. In some examples, the requirement is based on accelerator pedal depression or a diagnostic function. An advantage is that the engine can be rewed during idling efficiently.

The control system may be configured to control the engine to provide an increase in torque towards an engine torque target associated with the requirement to increase engine speed above the engine idle speed target, wherein the engine torque target is greater than a torque required to maintain engine speed at the engine idle speed target, and wherein controlling the electric traction motor to reduce a difference between the engine speed and the engine speed target comprises controlling the electric traction motor to provide inhibiting torque to inhibit the increase in torque of the engine from causing a deviation of engine speed from the engine speed target. In some examples, the inhibiting torque is configured to charge a traction battery. An advantage is that the engine can be rewed more efficiently, and engine torque reserve may be reduced.

The control system may be configured to receive an indication of a transmission mode, wherein the controlling the electric traction motor based on the engine speed target greater than the engine idle speed target (rewing) is performed when the transmission mode is a neutral or park transmission mode.

The control system may be configured to: receive an indication of torque demand based on accelerator pedal depression, less than a torque required to maintain engine speed at the engine idle speed target; and control the engine and/or the electric traction motor to increase torque in dependence on the torque demand. The transmission mode may be in drive mode. An advantage is improved responsiveness because a dead zone of accelerator pedal travel is reduced or removed.

The control system may be configured to: receive an indication of torque demand based on accelerator pedal depression; determine whether a condition is satisfied; and when the condition is satisfied, hold an electric traction motor torque target at a constant value and control the engine to increase torque, in response to the torque demand. The control system may be configured to receive an indication of a transmission mode, wherein satisfaction of the condition is dependent on the transmission mode. In some examples, satisfaction of the condition requires at least the transmission mode to be a drive transmission mode.

The electric traction motor may be a belt integrated starter generator and/or an engine accessory drive motor generator, or a crankshaft integrated motor generator.

According to another aspect of the invention there is provided a vehicle comprising the control system, the engine and the electric traction motor.

According to another aspect of the invention there is provided a method of controlling an engine and an electric traction motor of a vehicle, the method comprising: receiving an indication of engine speed during engine idling; and controlling the electric traction motor to reduce a difference between the engine speed and an engine idle speed target.

According to another aspect of the invention there is provided computer software that, when executed, is arranged to perform any one or more of the methods described herein.

According to a further aspect of the invention there is provided a non-transitory computer readable medium comprising computer readable instructions that, when executed by a processor, cause performance of any one or more of the methods described herein.

According to another aspect of the invention there is provided a control system configured to perform any one or more of the methods described herein.

The one or more controllers as described herein may collectively comprise: at least one electronic processor having an electrical input for receiving the indication; and at least one electronic memory device electrically coupled to the at least one electronic processor and having instructions stored therein; and wherein the at least one electronic processor is configured to access the at least one memory device and execute the instructions thereon so as to cause the control system to control the electric traction motor in dependence on the receiving an indication.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
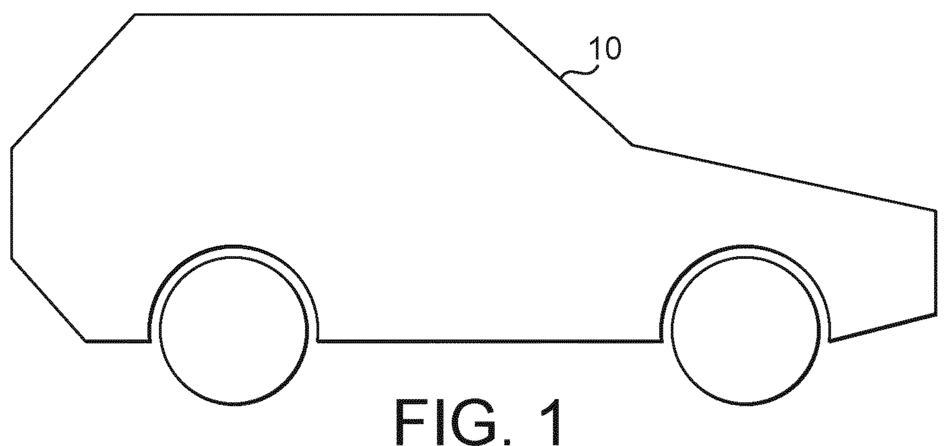
FIG. 1 illustrates an example of a vehicle.

FIG. 1 illustrates an example of a vehicle 10 in which embodiments of the invention can be implemented. In some, but not necessarily all examples, the vehicle 10 is a passenger vehicle, also referred to as a passenger car or as an automobile. In other examples, embodiments of the invention can be implemented for other applications, such as industrial vehicles.

The vehicle 10 may be a hybrid electric vehicle (HEV). If the vehicle 10 is an HEV, the vehicle 10 may be a full HEV or a mild HEV. Mild HEVs do not have an electric-only mode of propulsion, but the electric traction motor may be configured to provide assistance such as boosting output torque of the engine. Full HEVs have an electric-only mode of propulsion.

If the vehicle 10 is an HEV, the vehicle 10 may be configured to operate as a parallel HEV. Parallel HEVs comprise a torque path between the engine and at least one vehicle wheel, as well as a torque path between an electric traction motor and at least one vehicle wheel. The torque path(s) may be disconnectable by a torque path connector such as a clutch. Parallel HEVs differ from series HEVs, because in series HEVs the purpose of the engine is to generate electrical energy and there is no torque path between the engine and vehicle wheels.

Figure 2:
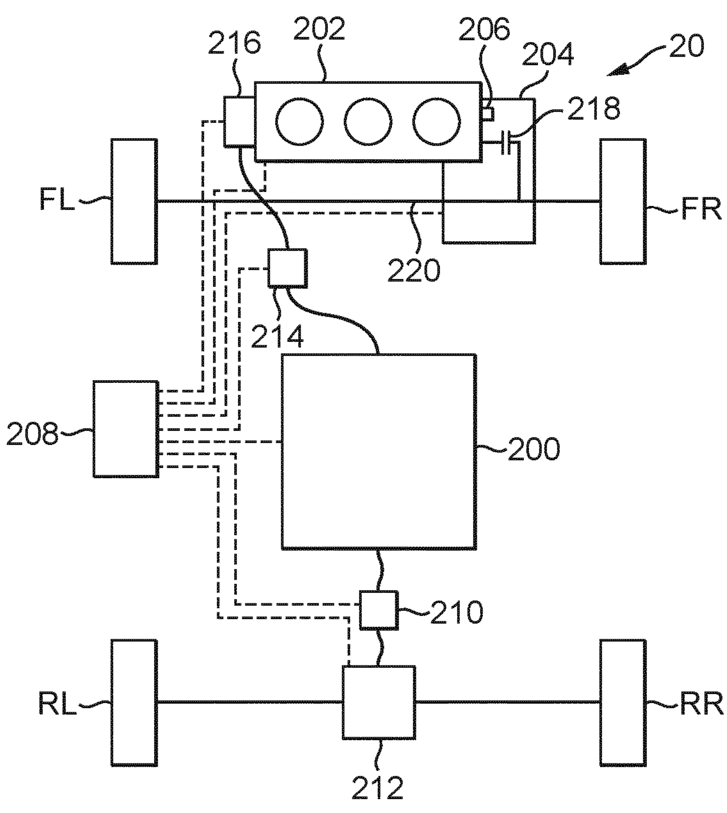
FIG. 2 illustrates an example of a system.

FIG. 2 illustrates a system 20 for a parallel HEV 10. The system 20 defines, at least in part, a powertrain of the HEV.

The system 20 comprises a control system 208. The control system 208 comprises one or more controllers. The control system 208 may comprise one or more of: a hybrid powertrain control module; an engine control unit; a transmission control unit; a traction battery management system; and/or the like.

The system 20 comprises an engine 202. The engine 202 is a combustion engine. The illustrated engine 202 is an internal combustion engine. The illustrated engine 202 comprises three combustion chambers, however a different number of combustion chambers may be provided in other examples.

The engine 202 is operably coupled to the control system 208 to enable the control system 208 to control output torque of the engine 202. The output torque of the engine 202 may be controlled by controlling one or more of: air-fuel ratio; spark timing; poppet valve lift; poppet valve timing; throttle opening position; fuel pressure; turbocharger boost pressure; and/or the like, depending on the type of engine 202.

The system 20 comprises an optional pinion starter 206 for starting the engine 202.

The system 20 comprises a vehicle transmission arrangement 204 for receiving output torque from the engine 202. The vehicle transmission arrangement 204 may comprise an automatic vehicle transmission, a manual vehicle transmission, or a semi-automatic vehicle transmission. The vehicle transmission arrangement 204 may comprise one or more friction clutches and/or a torque converter between the engine 202 and a gear train.

The system 20 may comprise a differential (not shown) for receiving output torque from the gear train. The differential may be integrated into the vehicle transmission arrangement 204 as a transaxle, or provided separately.

The engine 202 is mechanically connected or connectable to a first set of vehicle wheels (FL, FR) via a torque path 220. The torque path 220 extends from an output of the engine 202 to the vehicle transmission arrangement 204, then to axles/driveshafts, and then to the first set of vehicle wheels (FL, FR). In a vehicle overrun and/or friction braking situation, torque may flow from the first set of vehicle wheels (FL, FR) to the engine 202. Torque flow towards the first set of vehicle wheels (FL, FR) is positive torque, and torque flow from the first set of vehicle wheels (FL, FR) is negative torque.

The illustrated first set of vehicle wheels (FL, FR) comprises front wheels, and the axles are front transverse axles. Therefore, the system 20 is configured for front wheel drive by the engine 202. In another example, the first set of vehicle wheels (FL, FR) comprises rear wheels. The illustrated first set of vehicle wheels (FL, FR) is a pair of vehicle wheels, however a different number of vehicle wheels could be provided in other examples.

In the illustrated system 20, no longitudinal (centre) driveshaft is provided, to make room for hybrid vehicle components. Therefore, the engine 202 is not connectable to a second set of rear wheels (rear wheels RL, RR in the illustration). The engine 202 may be transverse mounted to save space. In an alternative example, the engine 202 may be configured to drive the front and rear wheels.

A torque path connector 218 such as a clutch is provided inside and/or outside a bell housing of the vehicle transmission arrangement 204. The clutch 218 is configured to connect and configured to disconnect the torque path 220 between the engine 202 and the first set of vehicle wheels (FL, FR). The system 20 may be configured to automatically actuate the clutch 218 without user intervention.

The system 20 comprises a first electric traction motor 216. The first electric traction motor 216 may be an alternating current induction motor or a permanent magnet motor, or another type of motor. The first electric traction motor 216 is located to the engine side of the clutch 218.

The first electric traction motor 216 may be mechanically coupled to the engine 202 via a belt or chain. For example, the first electric traction motor 216 may be a belt integrated starter generator. In the illustration, the first electric traction motor 216 is located at an accessory drive end of the engine 202, opposite a vehicle transmission end of the engine 202. In an alternative example, the first electric traction motor 216 is a crankshaft integrated motor generator, located at a vehicle transmission end of the engine 202.

The first electric traction motor 216 is configured to apply positive torque and configured to apply negative torque to a crankshaft of the engine 202, for example to provide functions such as: boosting output torque of the engine 202; deactivating (shutting off) the engine 202 while at a stop or coasting; activating (starting) the engine 202; and regenerative braking in a regeneration mode. In a hybrid electric vehicle mode, the engine 202 and first electric traction motor 216 are both operable to supply positive torque simultaneously to boost output torque. The first electric traction motor 216 may be incapable of sustained electric-only driving.

However, when the torque path 220 between the engine 202 and the first set of vehicle wheels (FL, FR) is disconnected, a torque path 220 between the first electric traction motor 216 and the first set of vehicle wheels (FL, FR) is also disconnected.

FIG. 2 illustrates a second electric traction motor 212 configured to enable at least an electric vehicle mode comprising electric-only driving. In some, but not necessarily all examples, a nominal maximum torque of the second electric traction motor 212 is greater than a nominal maximum torque of the first electric traction motor 216.

Even if the torque path 220 between the engine 202 and the first set of vehicle wheels (FL, FR) is disconnected by the clutch 218, the vehicle 10 can be driven in electric vehicle mode because the second electric traction motor 212 is connected to at least one vehicle wheel.

The illustrated second electric traction motor 212 is configured to provide torque to the illustrated second set of vehicle wheels (RL, RR). The second set of vehicle wheels (RL, RR) comprises vehicle wheels not from the first set of vehicle wheels (FL, FR). The illustrated second set of vehicle wheels (RL, RR) comprises rear wheels, and the second electric traction motor 212 is operable to provide torque to the rear wheels RL, RR via rear transverse axles. Therefore, the vehicle 10 is rear wheel driven in electric vehicle mode. In an alternative example, the second set of vehicle wheels comprises at least one vehicle wheel of the first set of vehicle wheels.

The control system 208 may be configured to disconnect the torque path 220 between the engine 202 and the first set of vehicle wheels (FL, FR) in electric vehicle mode, to reduce parasitic pumping energy losses. For example, the clutch 218 may be opened. In the example of FIG. 2, this means that the first electric traction motor 216 will also be disconnected from the first set of vehicle wheels (FL, FR).

Another benefit of the second electric traction motor 212 is that the second electric traction motor 212 may also be configured to operable in a hybrid electric vehicle mode, to enable four-wheel drive operation despite the absence of a centre driveshaft.

In order to store electrical power for the electric traction motors, the system 20 comprises a traction battery 200. The traction battery 200 provides a nominal voltage required by electrical power users such as the electric traction motors. If the electric traction motors run at different voltages, DC-DC converters (not shown) or the like may be provided to convert voltages.

The traction battery 200 may be a high voltage battery. High voltage traction batteries provide nominal voltages in the hundreds of volts, as opposed to traction batteries for mild HEVs which provide nominal voltages in the tens of volts. The traction battery 200 may have a voltage and capacity to support electric only driving for sustained distances. The traction battery 200 may have a capacity of several kilowatt-hours, to maximise range. The capacity may be in the tens of kilowatt-hours, or even over a hundred kilowatt-hours.

Although the traction battery 200 is illustrated as one entity, the function of the traction battery 200 could be implemented using a plurality of small traction batteries in different locations on the vehicle 10.

In some examples, the first electric traction motor 216 and second electric traction motor 212 may be configured to receive electrical energy from the same traction battery 200. By pairing the first (mild) electric traction motor 216 to a high-capacity battery (tens to hundreds of kilowatt-hours), the first electric traction motor 216 may be able to provide the functionality of the methods described herein for sustained periods of time, rather than for short bursts. In another example, the electric traction motors 212, 216 may be paired to different traction batteries.

Finally, the illustrated system 20 comprises inverters. Two inverters 210, 214 are shown, one for each electric traction motor. In other examples, one inverter or more than two inverters could be provided.

In an alternative implementation, the vehicle 10 may be other than shown in FIG. 2.

Figure 3A:
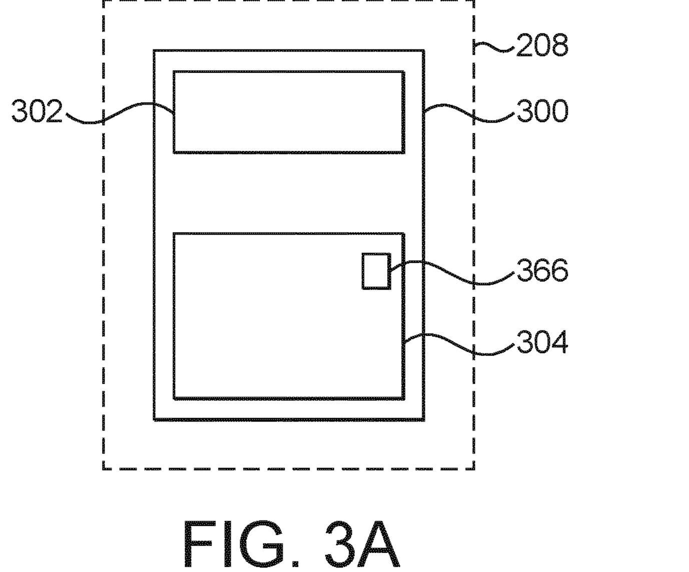
FIG. 3A illustrates an example of a control system and FIG. 3B illustrates an example of a non-transitory computer-readable storage medium.

FIG. 3A illustrates how the control system 208 may be implemented. The control system 208 of FIG. 3A illustrates a controller 300. In other examples, the control system 208 may comprise a plurality of controllers on-board and/or off-board the vehicle 10.

The controller 300 of FIG. 3A includes at least one electronic processor 302; and at least one electronic memory device 304 electrically coupled to the electronic processor 302 and having instructions 306 (e.g. a computer program) stored therein, the at least one electronic memory device 304 and the instructions 306 configured to, with the at least one electronic processor 302, cause any one or more of the methods described herein to be performed.

Figure 3B:
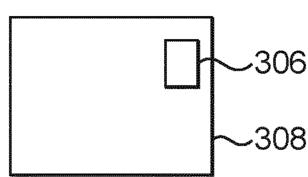

FIG. 3B illustrates a non-transitory computer-readable storage medium 308 comprising the instructions 306 (computer software).

The control system 208 may be configured to provide controller outputs to manipulate a variable (torque) towards a setpoint.

An example setpoint is at least one torque target. The at least one torque target may be normally based on torque demand such as driver torque demand (e.g. accelerator pedal depression, APD), an autonomous driving torque demand, or a cruise control torque demand. The at least one torque target may normally be proportional to torque demand. The torque target may comprise an engine torque target for controlling output torque of the engine. The torque target may comprise an electric traction motor torque target for controlling output torque of an electric traction motor.

Another example setpoint is an engine speed target, used during idling and other scenarios. Engine torque may be controlled to match engine speed to the engine speed target. Torque from the first electric traction motor may be controlled to match engine speed to the engine speed target, because the first electric traction motor 216 is mechanically coupled to the crankshaft of the engine 202.

FIGS. 4-8C illustrate methods of controlling the first electric traction motor during engine idling.

Engine idling may be required for various reasons. For example, the control system 208 may trigger engine idling based on a detection that a state of charge of the traction battery 200 is low. Engine idling may be triggered based on triggering of a diagnostic function for engine emissions testing. Engine idling may be used for sustained periods if an engine start-stop system (eco-stop) is deactivated.

FIGS. 4-8 illustrate flowcharts of various example methods 400, 500, 600, 700, 800 implemented by the control system 208. FIGS. 8A, 8B and 8C illustrate torque and speed as controlled by the methods 400, 500, 600, 700, 800.

Figure 8A:
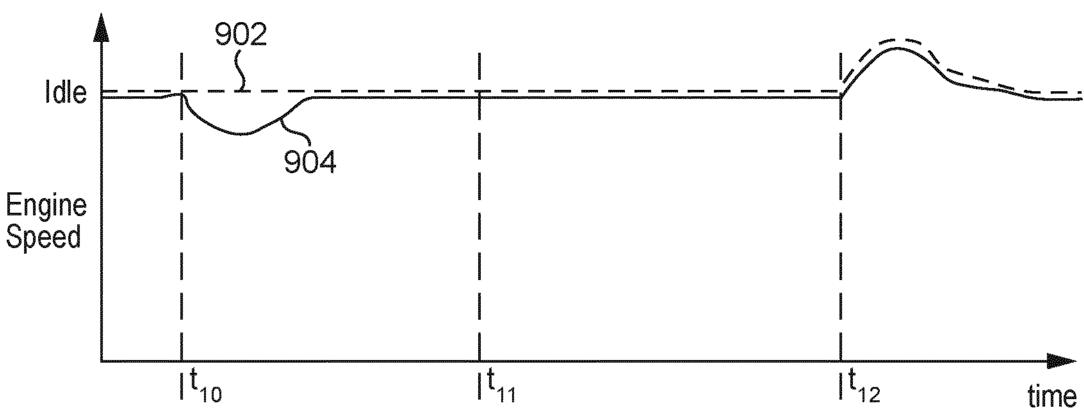
FIG. 8A illustrates an example of a graph with speed and time axes.

FIG. 8A illustrates a manipulated variable (engine speed) in the y-axis, against time in the x-axis, as a solid line curve 904. FIG. 8A also illustrates the magnitude of a setpoint (engine speed target) as a dashed line 902. When the engine speed target is a predetermined value associated with idling, and when no torque demand is requested, the engine speed target is an engine idle speed target. The predetermined value may be a value less than 1000 rpm (e.g. value from the range 300-700 rpm), and is marked in FIG. 8A as 'Idle'. The predetermined value may be fixed, or variable based on detected conditions (e.g. temperatures). During idling, an indication of engine speed may be provided to the control system 208 for closed loop control, similarly to non-idling scenarios.

Figure 8B:
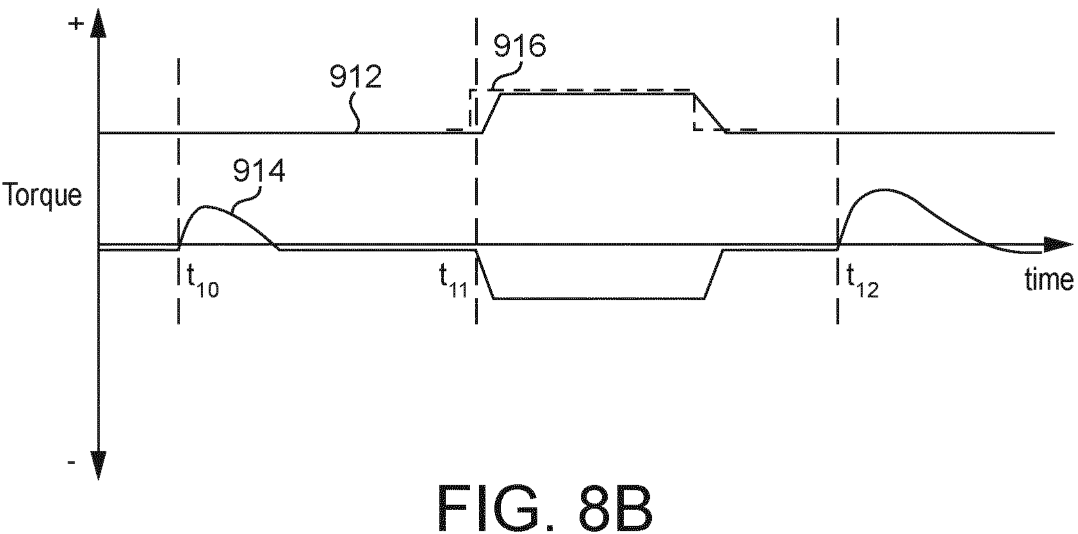
FIG. 8B illustrates an example of a graph with torque and time axes.
Figure 8C:
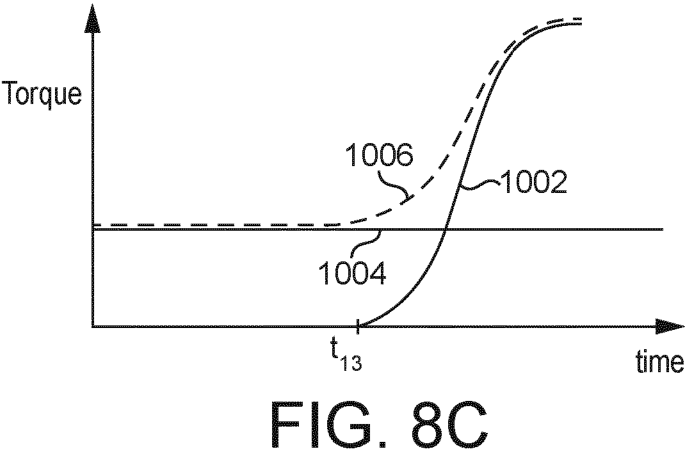
FIG. 8C illustrates an example of a graph with torque and time axes.

FIG. 8B illustrates the magnitudes of the controller outputs (engine torque 912 and first electric traction motor torque 914) in the y-axis, against time in the x-axis, which is aligned with the time axis of FIG. 8A. The dashed line 916 represents an engine torque target. FIG. 8C illustrates torque (y-axis) against time (x-axis) when leaving an idling state.

Times t10, t11, t12 and t13 in FIGS. 8A and 8B are plotted times which mark different illustrated events associated with engine idling. The event starting at time t10 indicates the result of the method 400 of FIG. 4. The event starting at time t11 indicates the result of the method 500 of FIG. 5. The event starting at time t12 indicates the result of the method 600 of FIG. 6. The event starting at time t13 indicates the result of the methods 700, 800 of FIGS. 7 and 8.

Figures 4, 5:
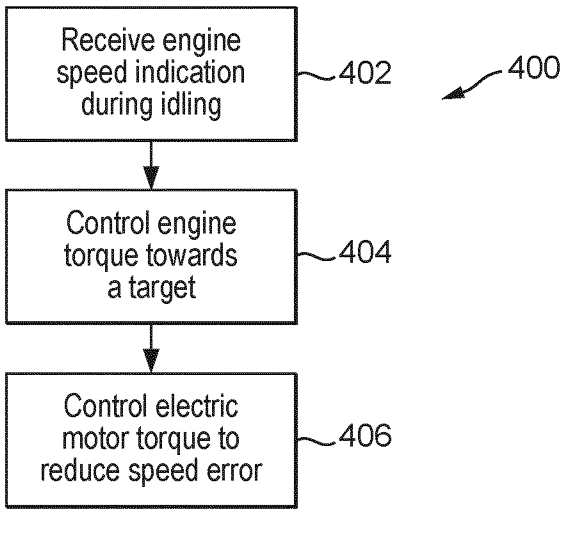
FIG. 4 illustrates an example of a method.
FIG. 5 illustrates an example of a method.

The method 400 of FIG. 4 and corresponding event at time t10 defines an aspect of the present invention, wherein the first electric traction motor 216 is controlled to reduce engine idle speed errors. The method 400 comprises: receiving an indication of engine speed during engine idling (block 402); optionally controlling the engine 202 based on a charging target for traction battery charging (block 404); and controlling the first electric traction motor 216 to reduce a difference between the engine speed and an engine idle speed target (block 406).

This method 400 results in reduced emissions during idling, due to increased use of the first electric traction motor 216 to control engine idle speed. If the engine 202 is active, torque from the engine 202 may be used to charge the traction battery 200.

According to block 402, an indication of engine speed is received. The indication may be based on measurements using known sensors.

According to optional block 404, the engine 202 provides torque towards a target.

In some, but not necessarily all examples, the target is based on a charging target. This is described in more detail in relation to FIG. 5. The charging target enables the engine to charge the traction battery 200 while the first electric traction motor 216 maintains engine speed at the engine idle speed target.

In some, but not necessarily all examples, the target is the engine idle speed target. The engine 202 may provide a torque contribution (e.g. open loop) towards the engine idle speed target.

In some, but not necessarily all examples, the engine 202 provides zero or negative torque, for example fuel may be cut from the engine 202 so that pumping losses through the engine 202 provide negative torque. The first electric traction motor 216 provides positive torque to ensure that engine speed is at the engine idle speed target. The engine 202 may be controlled to a zero/negative torque target, or may be deactivated so that block 404 is omitted.

In some, but not necessarily all examples, a minimum engine torque target is greater than a torque required for maintaining engine speed at the engine idle speed target. This may occur at high altitudes and/or cold temperatures when engines need to idle at higher speeds. The first electric traction motor 216 may maintain engine speed at the engine idle speed target by providing a negative torque offset.

According to block 406, the first electric traction motor 216 is configured to provide positive and negative torque adjustments as required, to reduce the difference (error) between the engine speed and the engine idle speed target. Torque of the first electric traction motor 216 may be controlled using closed loop feedback of engine speed, to minimise the error. The first electric traction motor 216 is more responsive and accurate than the engine 202 for closed loop operation.

FIG. 8B shows the first electric traction motor torque 914 increasing at time t10, due to engine speed 904 falling below the engine idle speed target 902 as shown in FIG. 8A. The first electric traction motor 216 quickly increases its torque to increase the engine speed to reduce the error, without the engine torque 912 needing to change based on the error.

If the engine speed needs to decrease due to engine speed rising above the engine idle speed target, the first electric traction motor 216 may be operated in the regeneration mode to decrease the difference, without the engine torque 912 needing to change.

The above approach is more fuel-efficient than retarding spark timing, and faster than relying on the limited negative torque which the engine 202 is capable of providing. Therefore, the engine 202 does not need to change its torque in response to the error. Therefore, the engine 202 may operate with less engine torque reserve (spark retard) during idling.

Operating with less engine torque reserve may comprise keeping spark timing at MBT (maximum brake torque) or less than 5 degrees of spark retard from the most efficient timing in a spark timing control map for the engine. In other examples, the engine 202 may contribute some torque to reduce the error.

The method 500 of FIG. 5 and corresponding event at time t11 defines an example implementation of the method 400 of FIG. 4, wherein the engine 202 provides charging torque, and first electric traction motor 216 ensures that engine speed remains at the engine idle speed target. The method 500 comprises: receiving an indication of a requirement to increase engine torque above a torque required to maintain engine speed at the engine idle speed target, based on a charging target (block 502); controlling the engine 202 based on the charging target to provide an increase in torque towards an engine torque target associated with the requirement (block 504); and controlling the first electric traction motor 216 to provide inhibiting torque to inhibit the increase in torque of the engine 202 from causing a deviation of engine speed from the engine idle speed target (block 506).

This allows the vehicle 10 to perform energy optimisation for journeys, and reduces emissions. Block 504 is equivalent to block 404 of FIG. 4, and block 506 is equivalent to blocks 402 and 406 of FIG. 4.

According to block 502, the requirement to increase engine torque is received. The requirement is a charging requirement based on a command to charge the traction battery 200. The command may be triggered automatically based on a detected low state of charge of the traction battery 200. In some examples, the command may be triggered manually. The charging requirement may indicate a rate variable such as required charging power.

According to block 504, an engine torque target based on the requirement is obtained, and acts as a setpoint for engine torque. The engine torque target is based on a charging target associated with the charging requirement. The engine torque target is not based on torque demand or the engine idle speed target. The charging target may indicate required charging power.

The engine torque target may be a variable as required charging power may be a variable. The engine torque target may be calculated based on the charging target using a map and/or pre-calibration data. The engine torque may be controlled towards the engine torque target in closed loop or open loop.

FIG. 8B shows from time t11 an engine torque target 916 increasing from a magnitude required to maintain engine speed at the engine idle speed target, to a greater positive magnitude. FIG. 8B shows the engine torque 912 rising in response to the increase of the engine torque target. This increases the rate of charging.

According to block 506, the engine speed does not increase because the first electric traction motor 216 provides an inhibiting torque, as shown by the negative torque 914 in FIG. 8B from time t11. Therefore, the engine speed 904 remains at the engine idle speed target 902 as shown in FIG. 8A. The first electric traction motor 216 is operated in a regeneration mode to provide the negative inhibiting torque to keep engine speed at the engine idle speed target. The inhibiting torque charges the traction battery 200.

The sum of torques of the engine 202 and of the first electric traction motor 216 may be substantially equal to the torque required to maintain engine speed at the engine idle speed target. The first electric traction motor 216 may continue to operate in closed loop to reduce engine idle speed error, as described above in relation to the method 400 and the event at time t10.

The engine torque target may be modified or overridden by load (torque demand), such as driver torque demand, autonomous driving torque demand, or cruise control torque demand. If torque demand increases above a threshold required to maintain engine speed at the engine idle speed target, then the engine torque target may additionally or alternatively become based on torque demand, enabling engine speed and/or tractive torque to rise.

In some implementations, the engine torque target may only be modified or overridden based on torque demand if the transmission arrangement 204 is in a drive mode, as opposed to a neutral or park mode. In neutral or park mode, the engine torque target may be increased in proportion to torque demand such as APD. This enables rewing in neutral/park, to increase a rate of charging of the traction battery 200.

The method 500 may require the vehicle 10 to be stationary, or in some examples may also be enabled during vehicle creeping (tractive torque provided while engine speed is at engine idle speed target, torque demand below threshold).

Figure 6:
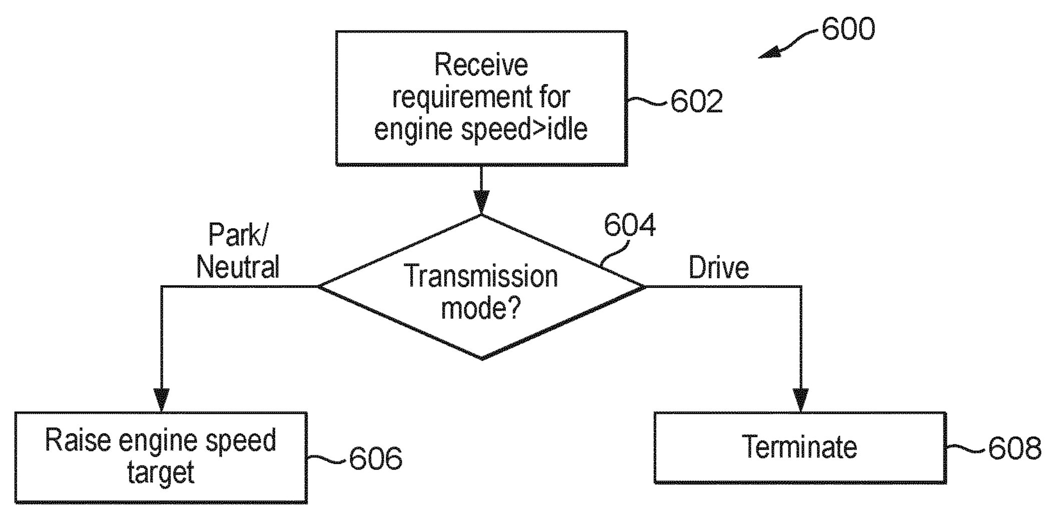
FIG. 6 illustrates an example of a method.

The method 600 of FIG. 6 and the corresponding event at time t12 defines an aspect of the present invention, wherein the first electric traction motor 216 is controlled to provide a rewing function that revs the engine 202 during engine idling. The method 600 comprises: receiving an indication of a requirement to increase engine speed above the engine idle speed target (block 602); optionally determining whether an indicated transmission mode of the vehicle transmission arrangement 204 is a neutral or park transmission mode (block 604); and controlling at least the first electric traction motor 216 to reduce a difference between the engine speed and an engine speed target associated with the requirement (block 606).

According to block 602, the requirement to increase engine speed is received. The requirement may arise for various reasons. For example, the requirement may be based on APD. In some examples, the requirement may be triggered by a diagnostic function, for example to test emissions of the engine 202 at an above-idle engine speed.

According to block 604, the method 600 determines whether to provide the rewing function. The determination is based on a transmission mode of the vehicle transmission arrangement 204.

The control system 208 may obtain an indication of the transmission mode, for example from a transmission control module. If the transmission mode indicates that the transmission arrangement 204 is not in-gear (e.g. Neutral and/or Park), the rewing function may be enabled.

If the transmission mode indicates that the transmission arrangement 204 is in-gear (e.g. Drive mode), the rewing function is not performed and the method terminates at block 608. The received indication may be treated as rewing in-gear, i.e. an intent to accelerate the vehicle 10, and a torque demand-based engine torque target may be implemented accordingly.

According to block 606, the engine speed target is modified from idle if the transmission mode is Park or Neutral. The engine speed target is based on the requirement, for example the engine speed target may be proportional to APD.

At block 606, the first electric traction motor 216 is controlled to modify its torque 914 to change engine speed towards the engine speed target. Optionally, the engine torque 912 may be modified concurrently, towards the engine speed target.

FIG. 8A illustrates the engine speed target 902 rising and then falling back to idle, for example based on a 'blip' of the accelerator pedal.

FIG. 8B illustrates the first electric traction motor torque 914 rising which causes the engine speed 904 to match the engine speed target 902. The first electric traction motor torque 914 then falls back towards idle based on the engine speed target 902.

In FIG. 8B, the engine 202 is in an activated state and provides some torque 912, wherein the first electric traction motor 216 provides the additional torque. In other implementations, the engine 202 may be in a deactivated state.

If the transmission mode is Drive, then the method 600 terminates at block 608 and a different control method may be used instead.

For rewing in Neutral/Park, the setpoint is speed-based, i.e. an engine speed target. For rewing in Drive, the setpoint may be torque-based rather than speed-based. For rewing in Drive, the engine torque target (setpoint) is based on torque demands, such as driver torque demands, autonomous driving torque demands, cruise control torque demands, etc.

In a first example use case of the method 600, the engine 202 does not provide additional torque. This is illustrated in FIG. 8B wherein the engine torque 912 remains constant from time t12. The first electric traction motor 216 provides the torque required for engine speed to reach the engine speed target.

The approach for the first use case reduces emissions when there is no benefit to increasing torque of the engine 202 or activating the engine 202. There is no benefit in situations such as impatient driver actuation of the accelerator pedal, or accidental actuation of the accelerator pedal.

In a second example use case of the method 600, not illustrated in FIG. 8B, the engine 202 provides most or all of the average torque required for engine speed to reach the engine speed target (e.g. open loop control). This may be beneficial during emissions testing, for example. If the engine 202 provides torque, the first electric traction motor 216 may operate in closed loop to enable substantially zero engine torque reserve (spark retard) (see FIG. 4 and time t10).

Figure 7:
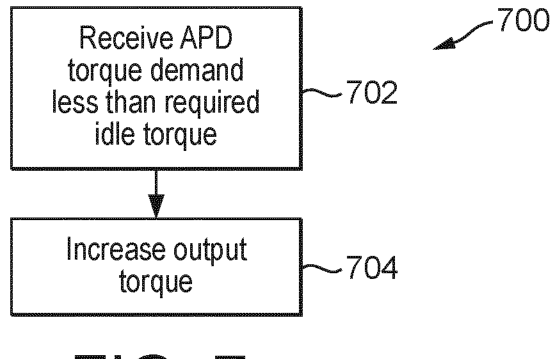
FIG. 7 illustrates an example of a method.

The method 700 of FIG. 7 and corresponding event at time t13 (FIG. 8C) defines an aspect of the present invention, for reducing a dead-zone of accelerator pedal travel when transitioning from automated to manual driving control, such as transitioning from idling to driving in-gear. The control system 208 is configured to: receive an indication of torque demand based on APD, less than a torque required to maintain engine speed at the engine idle speed target (block 702); and control the engine 202 and/or the first electric traction motor 216 to increase torque in dependence on the torque demand (block 704).

This provides improved throttle response when transitioning to manual control, because a response will be felt for an initial portion of accelerator pedal travel.

According to block 702, an indication of manually demanded torque is received, for example APD-based torque demand. The method 700 may be terminated or not implemented if the torque demand is demanded by an automatic system, for example an autonomous driving torque demand or a cruise control torque demand. FIG. 8C illustrates APD using a line 1002.

According to block 704, output torque is increased in dependence on the torque demand. In order to determine how much to increase the torque, the control system 208 determines a torque target based on the APD 1002. The torque target may be proportional to APD. The control system 208 then adds an additional torque (line 1004) to the APD-based torque target. Adding additional torque may comprise raising an engine speed target setpoint or raising a torque target setpoint.

This results in a modified torque target shown by dashed line 1006. The modified torque target 1006 is configured so that as APD increases from 0% the modified torque target 1006 does not initially decrease from its previous value as shown, or initially decreases to a lesser extent.

Adding the additional torque 1004 therefore creates a positive offset from the APD 1002, for reducing or removing the dead-zone of pedal travel.

The additional torque 1004 is added at least for the dead-zone range of APD travel. The dead-zone range is greater than 0% APD and equal to the percentage of APD which requests torque equal to the torque required to maintain engine idle speed.

In some, but not necessarily all examples, the additional torque 1004 is at least equal to engine idling torque, for example a measured or requested torque based on the engine idle speed target. Therefore, there is no initial jump in torque when transitioning from idling to driving.

As shown in FIG. 8C, the control system 208 may be configured to blend out the contribution of the additional torque 1004 to the modified torque target 1006 as vehicle speed and/or APD increases, until the controller output torque demand is based on APD and no longer dependent on the engine idling torque.

FIG. 8C illustrates the effect of blending out the contribution of the additional torque 1004. The gradient and/or magnitude of the modified torque target line 1006 is seen to converge with the gradient and/or magnitude of the APD torque line 1002, until both lines follow the same trajectory. The additional torque 1004 may be fully blended out at some point before 100% APD is reached, as illustrated in FIG. 8C.

In some examples, block 704 of the method 700 of FIG. 7 may be performed in response to a determination in block 604 of the method 600 of FIG. 6 that the transmission mode is a Drive mode. Therefore, the methods 600, 700 of FIGS. 6 and 7 could be merged. Blocks 602 and 702 may be the same step (receive APD).

In an implementation of block 704, the modified torque target 1006 may comprise an engine torque target.

For purposes of this disclosure, it is to be understood that the controller(s) 300 described herein can each comprise a control unit or computational device having one or more electronic processors 302. A vehicle 10 and/or a system thereof may comprise a single control unit or electronic controller or alternatively different functions of the controller(s) may be embodied in, or hosted in, different control units or controllers. A set of instructions could be provided which, when executed, cause said controller(s) or control unit(s) to implement the control techniques described herein (including the described method(s)). The set of instructions may be embedded in one or more electronic processors, or alternatively, the set of instructions could be provided as software to be executed by one or more electronic processor (s). For example, a first controller may be implemented in software run on one or more electronic processors, and one or more other controllers may also be implemented in software run on one or more electronic processors, optionally the same one or more processors as the first controller. It will be appreciated, however, that other arrangements are also useful, and therefore, the present disclosure is not intended to be limited to any particular arrangement. In any event, the set of instructions described above may be embedded in a computer-readable storage medium (e.g., a non-transitory computer-readable storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; or electrical or other types of medium for storing such information/instructions.

It will be appreciated that various changes and modifications can be made to the present invention without departing from the scope of the present application.

The blocks illustrated in FIGS. 4-8 may represent steps in a method and/or sections of code in the computer program 306. The illustration of a particular order to the blocks does not necessarily imply that there is a required or preferred order for the blocks and the order and arrangement of the block may be varied. Furthermore, it may be possible for some steps to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A control system for controlling an engine and a first electric traction motor of a vehicle, the control system comprising one or more controllers, wherein the control system is configured to:

receive an indication of engine speed during engine idling;

control the first electric traction motor to reduce a difference between the engine speed and an engine idle speed target including using the first electric traction motor to reduce the engine speed when the engine speed is above the engine idle speed target; and control the engine based on a charging target for a traction battery charging while maintaining engine spark retardation of substantially zero relative to maximum brake torque ignition timing, wherein the first electric traction motor is configured to provide a positive torque to the engine, wherein the traction battery is connected to a second electric traction motor configured to provide torque to a drivetrain of the vehicle.

2. The control system of claim 1, wherein the one or more controllers collectively comprise:

at least one electronic processor having an electrical input for receiving the indication; and at least one electronic memory device electrically coupled to the at least one electronic processor and having instructions stored therein;

and wherein the at least one electronic processor is configured to access the at least one memory device and execute the instructions thereon so as to cause the control system to control the electric traction motor in dependence on the receiving an indication.

3. The control system of claim 1, wherein the charging target is variable to enable a variable rate of charging, and wherein the control system is configured to vary torque of the engine based on variation of the charging target.

4. The control system of claim 1, configured to control the engine based on the charging target while maintaining an ignition timing retardation of zero or less than 5 degrees of retardation from the maximum brake torque ignition timing or from a most efficient ignition timing of a control map for the engine if different.

5. The control system of claim 1, configured to:

receive an indication of a requirement to increase engine torque above a torque required to maintain engine speed at the engine idle speed target, based on the charging target;

wherein controlling the engine based on a charging target comprises controlling the engine to provide an increase in torque towards an engine torque target associated with the requirement; and wherein controlling the electric traction motor to reduce a difference between the engine speed and an engine idle speed target comprises controlling the electric traction motor to provide inhibiting torque to inhibit the increase in torque of the engine from causing a deviation of engine speed from the engine idle speed target.

6. The control system of claim 1, configured to:

receive an indication of a requirement to increase engine speed above the engine idle speed target; and control at least the electric traction motor to reduce a difference between the engine speed and an engine speed target associated with the requirement.

7. The control system of claim 6, wherein the requirement is based on accelerator pedal depression or a diagnostic function.

8. The control system of claim 6, configured to control the engine to provide an increase in torque towards an engine torque target associated with the requirement to increase engine speed above the engine idle speed target, wherein the engine torque target is greater than a torque required to maintain engine speed at the engine idle speed target, and wherein controlling the electric traction motor to reduce a difference between the engine speed and the engine speed target comprises controlling the electric traction motor to provide inhibiting torque to inhibit the increase in torque of the engine from causing a deviation of engine speed from the engine speed target.

9. The control system of claim 8, wherein the inhibiting torque associated with the engine speed target greater than the engine idle speed target is configured for traction battery charging.

10. The control system of claim 6, configured to receive an indication of transmission mode, wherein the controlling the electric traction motor based on the engine speed target greater than the engine idle speed target is performed when the transmission mode is a neutral or park transmission mode.

11. The control system of claim 1, configured to:

receive an indication of torque demand based on accelerator pedal depression, less than a torque required to maintain engine speed at the engine idle speed target; and control the engine and/or the electric traction motor to increase torque in dependence on the torque demand.

12. The control system of claim 1, configured to:

receive an indication of torque demand based on accelerator pedal depression;

determine whether a condition is satisfied; and when the condition is satisfied, hold an electric traction motor torque target at a constant value and control the engine to increase torque, in response to the torque demand.

13. The control system of claim 12, configured to receive an indication of transmission mode, wherein satisfaction of the condition is dependent on the transmission mode.

14. The control system of claim 13, wherein satisfaction of the condition requires at least the transmission mode to be a drive transmission mode.

15. The control system of claim 1, wherein the electric traction motor is a belt integrated starter generator, and/or an engine accessory drive motor generator, or a crankshaft integrated motor generator.

16. A vehicle comprising the control system, the engine and the electric traction motor of claim 1.

17. A method of controlling an engine and a first electric traction motor of a vehicle, the method comprising:

receiving an indication of engine speed during engine idling;

controlling the first electric traction motor to reduce a difference between the engine speed and an engine idle speed target including using the first electric traction motor to reduce the engine speed when the engine speed is above the engine idle speed target; and controlling the engine based on a charging target for a traction battery charging while maintaining engine spark retardation of substantially zero relative to maximum brake torque ignition timing, wherein the first electric traction motor is configured to provide a positive torque to the engine, wherein the traction battery is connected to a second electric traction motor configured to provide torque to a drivetrain of the vehicle.

18. A non-transitory, computer-readable medium having stored thereon computer software that, when executed, is arranged to perform the method according to claim 17.

19. A control system for controlling an engine and a first electric traction motor of a vehicle, the control system comprising one or more controllers, wherein the control system is configured to:

receive an indication of engine speed during engine idling;

control the first electric traction motor to reduce a difference between the engine speed and an engine idle speed target including using the first electric traction motor to reduce the engine speed when the engine speed is above the engine idle speed target; and control the engine based on a charging target for a traction battery charging while maintaining an ignition timing retardation of zero or less than 5 degrees of retardation from a maximum brake torque ignition timing or from a most efficient ignition timing of a control map for the engine if different, wherein the first electric traction motor is configured to provide a positive torque to the engine, wherein the traction battery is connected to a second electric traction motor configured to provide torque to a drivetrain of the vehicle.

20. The control system of claim 19, further comprising a torque path between the first electric motor, the engine, and a first set of vehicle wheels, wherein the control system is further configured to:

disconnect the torque path such that the engine and the first electric motor are disconnected from the first set of vehicle wheels; and instruct the second electric traction motor to provide torque directly to the drivetrain of the vehicle while the torque path is disconnected.

* * * * *